(No Model.)
M. R. HUBBELL & W. W. CATE.
ROTARY CYLINDER PLANER.
No. 512,583.          Patented Jan. 9, 1894.
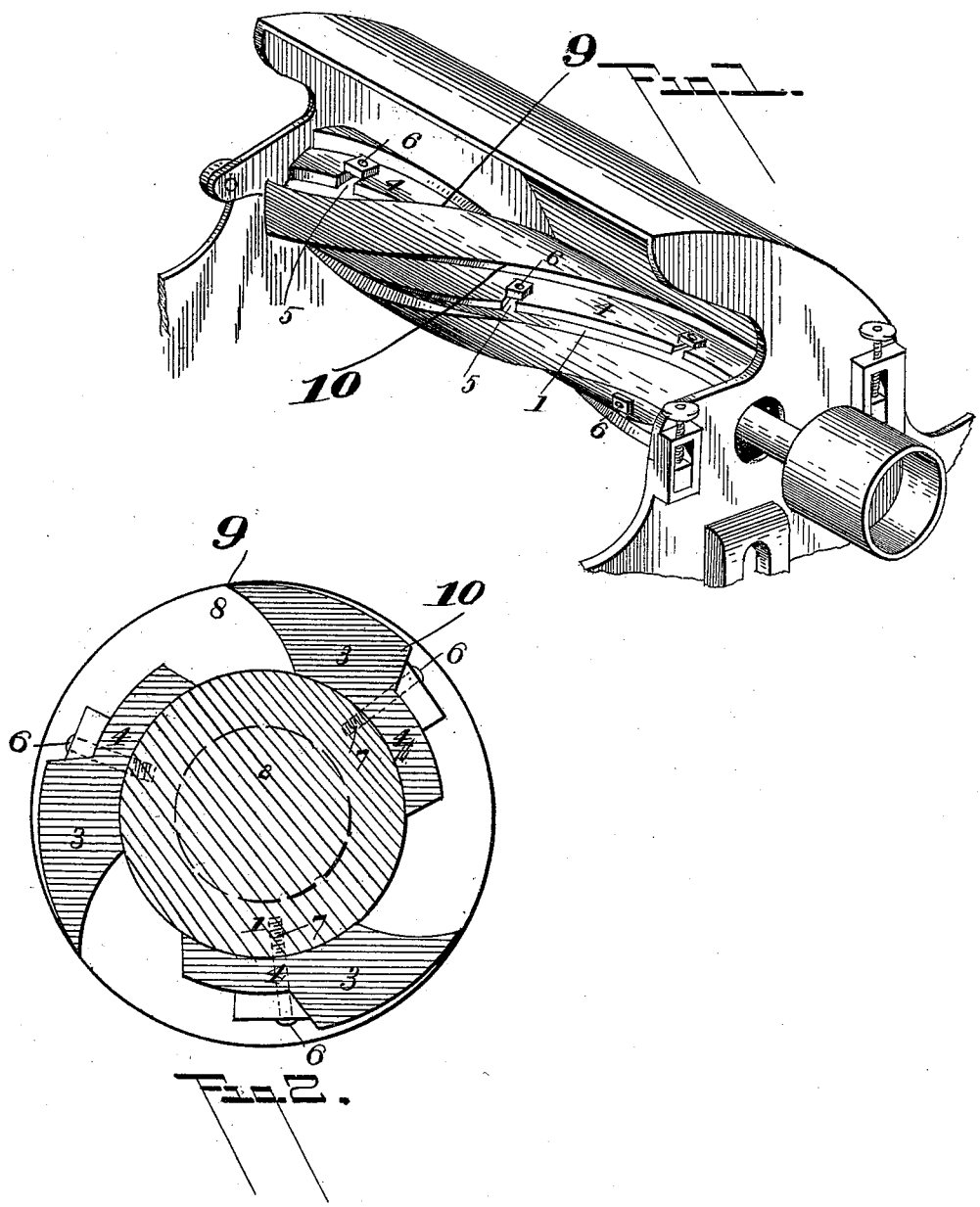
Witnesses:
F. L. Ourand
E. H. Monroe
Inventors:
Myron R. Hubbell and
William W. Cate
by J. Fred Reily
their Attorney
THE NATIONAL LITHOGRAPHING COMPANY,
WASHINGTON, D. C.

UNITED STATES PATENT OFFICE.

MYRON R. HUBBELL AND WILLIAM W. CATE, OF WOLCOTT, VERMONT.

ROTARY CYLINDER PLANER.

SPECIFICATION forming part of Letters Patent No. 512,583, dated January 9, 1894.

Application filed February 20, 1893. Serial No. 463,112. (No model.)

*To all whom it may concern:*

Be it known that we, MYRON R. HUBBELL and WILLIAM W. CATE, citizens of the United States, residing at Wolcott, in the county of Lamoille and State of Vermont, have invented certain new and useful Improvements in Rotary Cylinder Planers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention consists in a rotary cylinder planer; embodying valuable features which give it great efficiency in operation: and our invention will be hereinafter fully described and claimed.

In the accompanying drawings, Figure 1 is a perspective view of our rotary cylinder planer and the hood which partly incloses it. Fig. 2 is a transverse section of the same, on an enlarged scale.

Referring to the several parts by their designating numerals, the same numerals of reference indicate corresponding parts in both figures.

1 indicates the body of the cylinder, which is provided with the arbor, 2; this cylinder being, as shown in Figs. 1 and 2, perfectly round and smooth. Upon this round cylinder we arrange and secure spiral knives, 3, which are formed with such a spiral curvature that they fit with their concave inner sides snugly upon the round cylinder, extending spirally around the same from end to end. We have shown three of these knives in the drawings, but their number, and size, may of course be varied as desired. Each of these spiral blades has its rear part, 4, reduced in thickness to about half that of the blade proper, and this reduced rear part is formed with slots or openings, 5, through which pass the securing bolts, 6, which secure the knives to the round cylinder; the inner ends of these bolts entering threaded apertures 7 in the cylinder. Any other suitable means for securing the spiral blades to the round cylinder may of course be employed without departing from the spirit of our invention. The front part, 8, of each blade tapers gradually in thickness from its front cutting edge, 9, to its rear shoulder, 10, as will be most clearly seen by reference to the enlarged end-view, Fig. 2, and the blade is inwardly beveled and sharpened upon its front edge, as shown. It will be seen that by this construction, by the knives tapering on their outer surface from their front cutting edge to their rear edge, and by grinding the knives upon their inner front edge, as shown, their sharp cutting edge 9 is always the most prominent part of the knives; and that by this construction the cutting edges of all the knives will always, no matter how often they are sharpened, be the same distance from the cylinder; that is, the cutting edge of each knife will stand at precisely the same distance from the round surface of the cylinder as the corresponding edges of the other spiral knives. This construction of the spiral knives, tapering gradually in thickness from their outer cutting edge to their rear end, and inwardly beveled and sharpened upon their front edge, is one of the most important features of our invention. The cutting edges of the spiral knives being thus all at precisely the same distance from the cylinder will leave a perfectly smooth surface on the timber which they have planed.

It will be seen that by the peculiar construction of our blades, making them of sufficient thickness and having them underground at their front edges so as to provide clearance for the chips or shavings, we can use a perfectly plain cylinder head, a true cylinder, dispensing with all clearing grooves or raised seats on the cylinder. The blades only require adjustment when one blade is ground down in sharpening or when a new blade is substituted for one that is worn out, in order to always preserve the same relative distance between the cutting edges of the several spiral blades, as will be readily understood.

It will be seen that our spiral knives secured on the revolving cylinder, which is revolved by the application of suitable power to the end of the arbor 2, will plane with a drawing cut and also a shearing cut, both at the same time, by which they are able to plane smoothly over knots and cross-grained timber. Their spiral shape also gives a continuous, steady, cut to the knives, and causes the machine to run steadily, requiring less power to revolve the cylinder. The knives can be readily removed to sharpen them.

From the foregoing description, taken in connection with the accompanying drawings, the great practical advantages of our invention will be clearly understood.

Having thus described our invention, what we claim, and desire to secure by Letters Patent, is—

1. The combination of the cylindrical body forming a true cylinder, and the spiral knives of sufficient thickness and so under-ground at their front edges as to provide clearance for the chips having their inner faces curved to fit the surface of said cylinder, and removably secured thereon; substantially as set forth.

2. The combination of the cylindrical body forming a true cylinder, and the spiral adjustable knives of sufficient thickness and so under-ground at their front edges as to provide clearance for the chips having their inner faces curved to fit the surface of said cylinder, and adjustably secured thereon; substantially as set forth.

3. The combination of the cylindrical body forming a true cylinder, and the spiral knives of sufficient thickness and so under-ground at their front edges as to provide clearance for the chips having their inner faces curved to fit said cylinder, and removably secured thereon, and decreasing in thickness from their front to their rear edges, substantially as and for the purpose set forth.

4. In a rotary cylinder planer, the spiral blade having its inner face curved to fit a plain cylinder, tapering in thickness from its front to its rear edge, and formed of sufficient thickness and so under-ground at its front cutting edge as to provide clearance for the chips; substantially as set forth.

In testimony whereof we affix our signatures in presence of two witnesses.

MYRON R. HUBBELL.
WILLIAM W. CATE.

Witnesses:
MOSES J. LEACH,
L. D. WEBSTER.